July 22, 1941.   J. H. GENTRY   2,249,730
MULTIPLE NEGATIVE DUPLICATOR
Filed Dec. 21, 1938   3 Sheets-Sheet 1
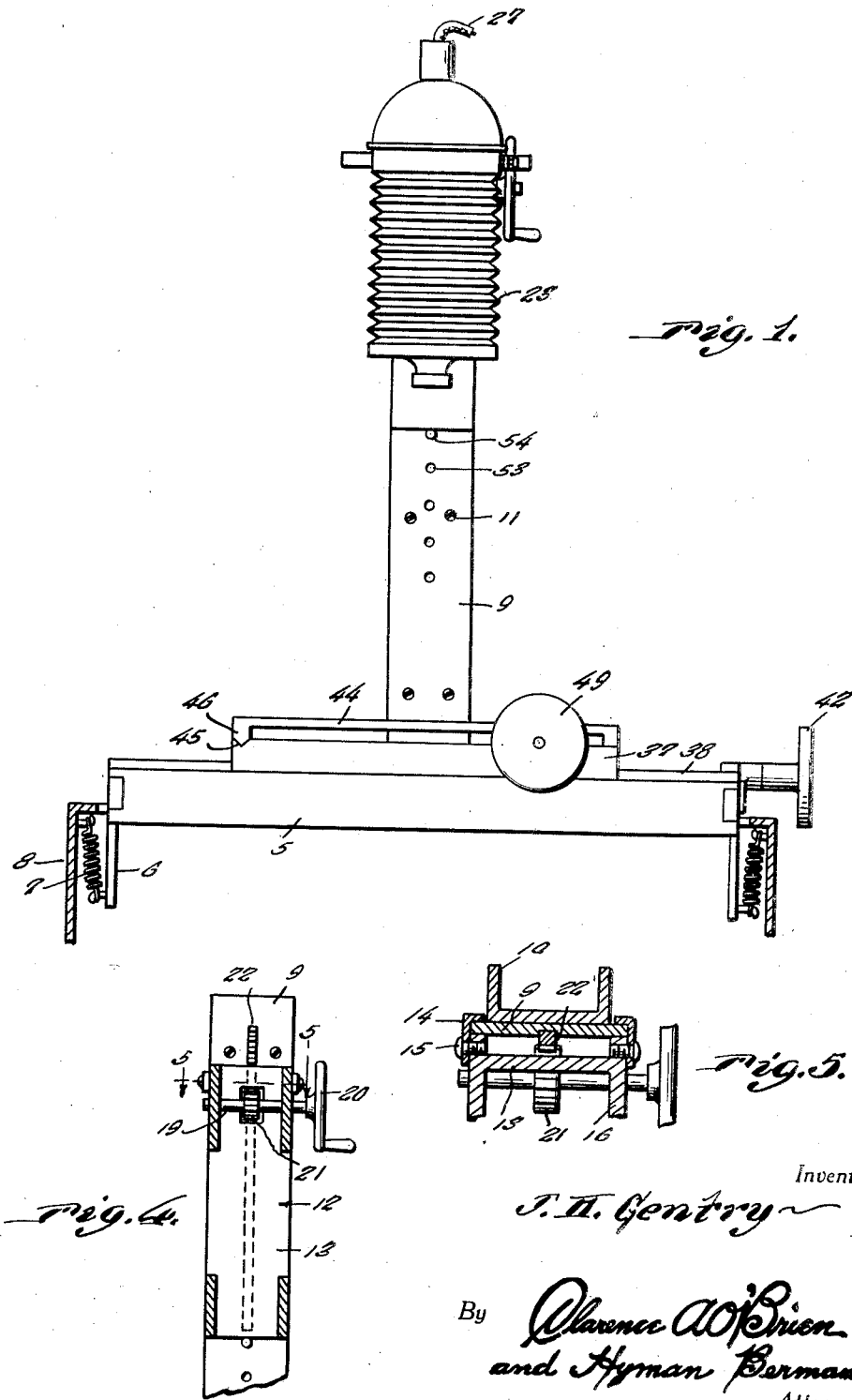
Inventor
J. H. Gentry
By Clarence A. O'Brien
and Hyman Berman
Attorneys

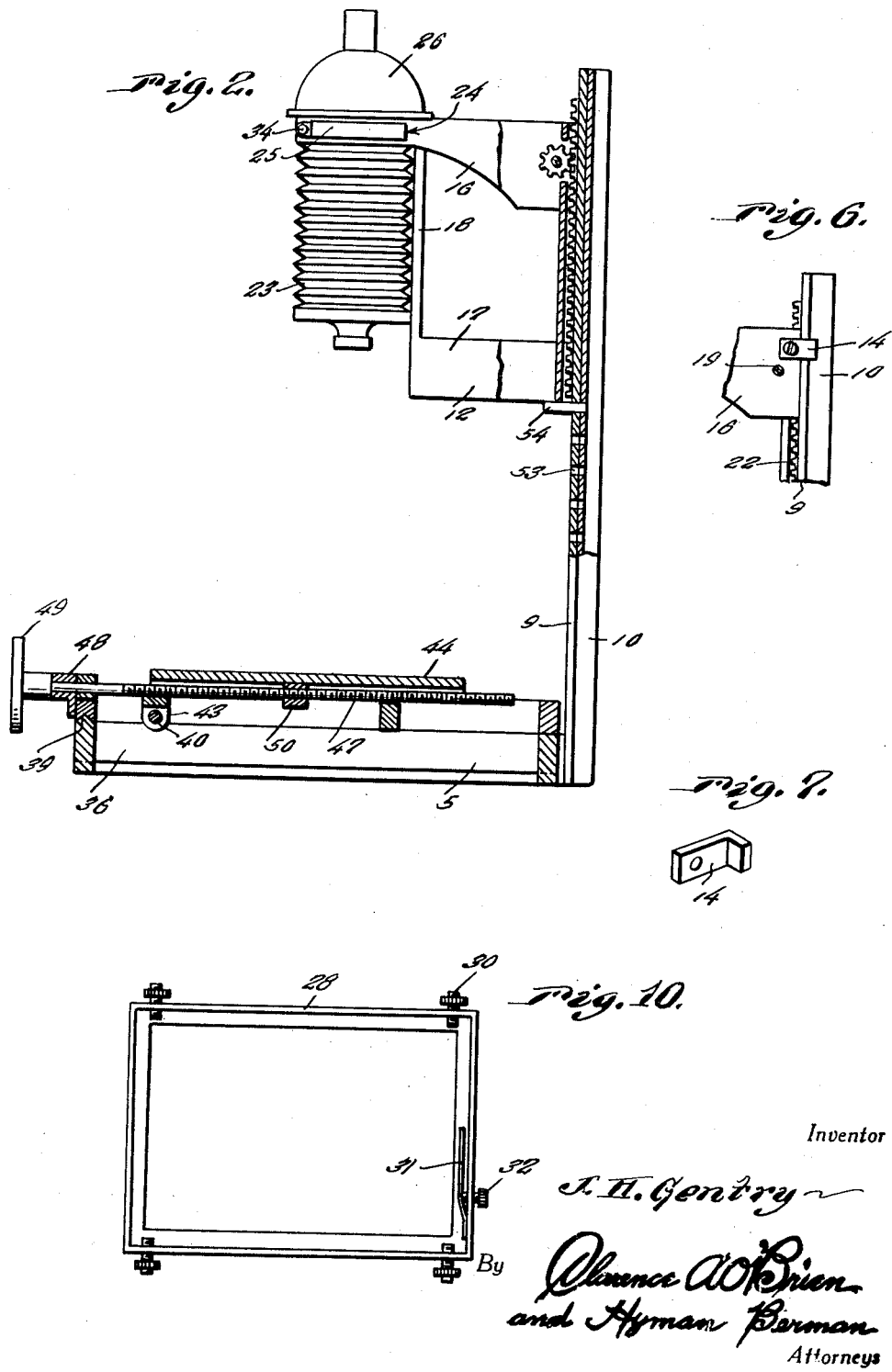

July 22, 1941.                J. H. GENTRY                2,249,730
                    MULTIPLE NEGATIVE DUPLICATOR
                     Filed Dec. 21, 1938          3 Sheets-Sheet 3
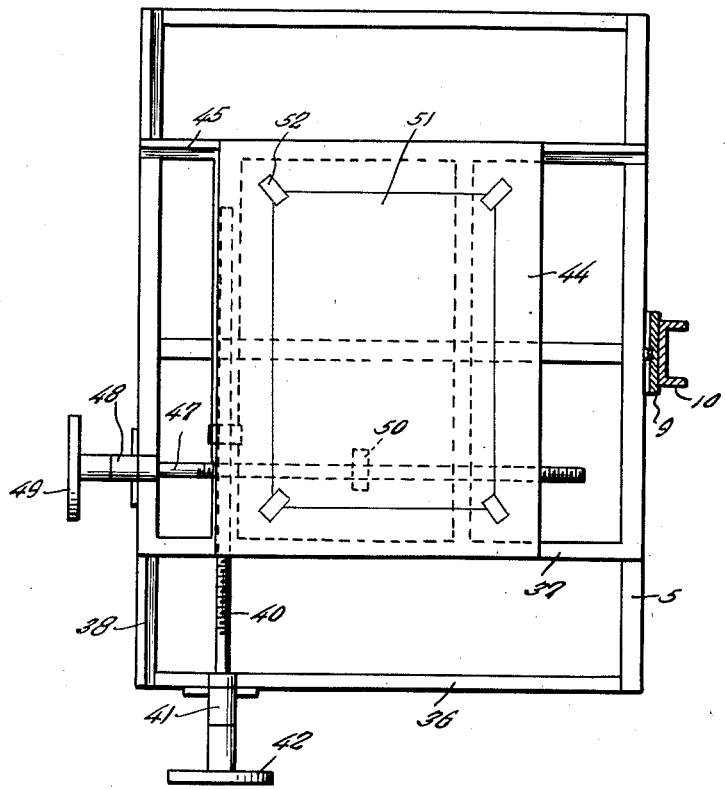
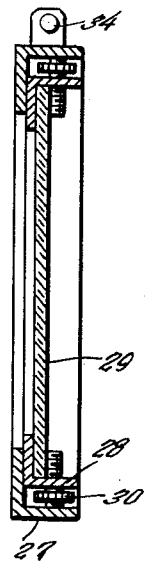
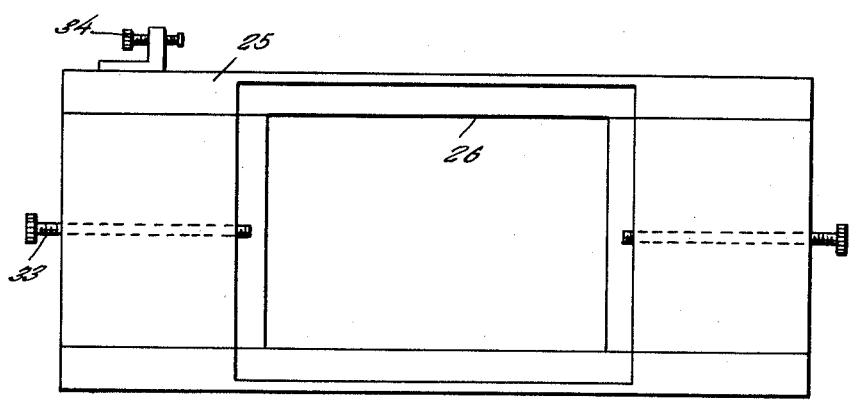
Inventor
J. H. Gentry
By Clarence A. O'Brien
and Hyman Berman
Attorneys Patented July 22, 1941

2,249,730

UNITED STATES PATENT OFFICE 2,249,730

MULTIPLE NEGATIVE DUPLICATOR

James H. Gentry, Philadelphia, Pa., assignor of one-half to Raymond W. Dailey, Haddon Heights, N. J.

Application December 21, 1938, Serial No. 247,134

2 Claims. (Cl. 88—24)

The present invention relates to photographic reproduction devices which may be termed as a step and repeat machine unit for photo-engraving and lithographic uses, and has for its primary object to provide an apparatus by means of which a photographic negative may be placed in a chase holder and placed in position in a projection camera for transferring the picture to a sensitized sheet supported in position in the path of the camera whereby to provide a method of duplicating the original negative to many various sizes, quantities and colors.

An important object of the present invention is also to provide a negative chase within which the photographic negative may be positioned and adjusted for squareness in order to obtain a true register of succeeding negatives of the same subject.

Another object is to provide a holder for the chase adapted to support the latter in adjusted position within the projection camera.

A still further object is to provide a bed support for the sensitized sheet upon which the picture is to be reproduced to provide the working negative for step and repeat machine use or direct contact use for lithographing purposes, and in which the bed support is adapted for adjustment in all directions at right angles to the path of projection of the camera in order to obtain a perfect register or measure for one or more colors.

Other objects and advantages reside in the details of construction and operation as more fully hereinafter described and claimed, reference being had to the accompanying drawings forming part hereof, wherein like numerals refer to like parts throughout, and in which—

Figure 1 is a front elevational view of the duplicating machine with parts of the supporting cabinet or base broken away and shown in section.

Figure 2 is a side elevational view with parts broken away and shown in section.

Figure 3 is a top plan view of the supporting bed for the sensitized sheets and with the camera support shown in section.

Figure 4 is a sectional view through the camera supporting bracket.

Figure 5 is a transverse sectional view taken substantially on a line 5—5 of Figure 4.

Figure 6 is a detail, in side elevation, of the guide jib for the camera supporting bracket.

Figure 7 is a perspective view of one of the guide jibs.

Figure 8 is a plan view of the chase holder.

Figure 9 is a transverse sectional view therethrough, and

Figure 10 is a plan view of the negative supporting chase.

Referring now to the drawings in detail, the numeral 5 designates an open bed frame of substantially rectangular form which is provided at opposite sides with a pair of depending legs 6 to which suspension hooks 7 are attached for suspending the frame within a suitable cabinet or supporting structure 8.

Rising from one edge of the frame is an upstanding support 9 having a channel member 10 extending longitudinally thereof and secured to its outer surface by screws or the like 11 to reinforce the support.

A camera supporting bracket designated generally at 12 is mounted for vertical adjustment on the support 9, the bracket including a vertical plate 13 disposed parallel to the support 9 and connected to the support for vertical sliding movement by means of a pair of L-shaped jibs 14 secured to the sides of the frame by screws 15 as more clearly illustrated in Figures 5 and 6 of the drawings.

Projecting forwardly of the plate 13 at the side edges thereof are upper and lower pairs of arms 16 and 17 respectively, connected by a vertical member 18.

Journalled in the upper arms 16 is a shaft 19 having a manipulating wheel 20 on one end and having a pinion 21 secured thereto for engagement with a rack 22 extending vertically of the support 9.

To the bracket 12 is secured the projection camera 23 of conventional enlarging type which is supported vertically on the bracket and provided at its upper end with a chase holder receiving compartment 24 within which the chase holder designated generally at 25 is adapted for removable insertion. Immediately above the compartment 24 is a dome-shaped lamp casing 26 having an ordinary electric bulb (not shown) therein and connected by the circuit wires 27 leading to the casing, the casing having open communication with the compartment 24 for subjecting the negative positioned in the chase 25 to the light from the bulb mounted in said casing in a manner as will be apparent.

The chase holder 25 is of flat rectangular form and is provided with an opening 26 having angular side and end edges as shown at 27 in Figure 9 of the drawings and within which is positioned the chase 28 shown in detail in Figure 10 of the drawings, and likewise of substantially rectangular formation and of open frame construction having angle side and end edges to accommodate a negative or positive plate 29 for clamping the negative in position in the chase, the plate being held by adjusting screws 30. As more clearly illustrated in Figure 9 of the drawings, the heads of the screws abut the sides of the holder 27 whereby to center the chase in the holder, and the inner ends of the screws project inwardly in overlying relation with the plate 29 to secure the plate in the chase. At one end of the chase is also provided a leaf spring 31 having one end fixedly secured to the side of the chase and its free end adapted to bear against the plate 29 to yieldably hold the negative or positive in position. The spring is provided with a set screw 32 engaging the spring to adjust the tension thereof.

The adjusting screws 30 are positioned on the longitudinal side edges of the chase and adapted for adjusting the chase transversely in the opening 26 whereas longitudinal adjustment of the chase in said opening is provided by means of set screws 33 threaded through the end portions of the chase holder 25. One longitudinal side edge of the chase holder is also provided with a set screw 34 for properly adjusting the chase holder in position in the chamber 24 of the camera. The bed frame 5 includes a lower open frame 36 and an upper open frame 37 with two of their parallel edges arranged in superposed relation, the upper surface of one of said edges of the lower frame 36 being formed with an inverted V 38 constituting a guide seated in the V accommodating groove 39 formed on the under side of the adjacent edge of the upper frame 37 to provide for the longitudinal adjustment of the upper frame 37 on the lower frame 36 in a manner as will be apparent.

Adjustment of the upper frame 37 is accomplished by means of a screw 40 journalled in a bearing 41 secured to the frame 36 and having at its outer end a manipulating wheel 42, the screw having threaded engagement with a lug 43 extending beneath the upper frame 37.

Supported on the upper frame 37 is a plate 44 adapted for adjustment transversely with respect to the direction of adjustment of the upper frame 37, one of the side frame members of the frame 37 being provided with a V groove 45 within which is comfortably fitted the V edge 46 of the plate 44. Adjustment of the plate is provided by means of a screw 47 journalled adjacent one end in a bearing bracket 48 secured to the frame 37, the outer end of the screw being provided with a manipulating wheel 49 and the screw being threaded through a lug 50 secured to the under side of the plate.

To the upper surface of the plate 44 is secured the sensitized sheet 51 by means of adhesive strips 52 securing the corners of the sensitized sheet to the plate as clearly shown in Figure 3 of the drawings.

By means of the adjustment of the plate 44 either transversely or longitudinally with respect to the supporting bed the sensitized sheet may be properly centered beneath the camera 23.

Vertically spaced openings 53 are also formed in the upright support 9 for removably receiving a pin 54 to support the camera supporting bracket in a fixed vertically adjusted position, whereby after the adjustment has once been set numerous reproductions may be made at the desired setting.

While I have illustrated a machine with the camera positioned vertically above the supporting bed, it will be understood that the machine is equally well adapted for making reproductions with the camera positioned horizontally and the bed plate positioned vertically, that is, opposite to the arrangement heretofore described.

It will further be understood that the machine must be operated in a dark room by reason of the use of any sensitized agent or photographic material in the reproduction process.

In the operation of the device the negative or positive is supported in position in the chase 28 which is then secured and properly adjusted in the chase holder 25, after which the chase holder with the negative or positive secured therein is placed in the chamber 24 above the camera and the sensitized sheet, on which the picture is to be reproduced, is positioned on the plate 44 and the bed frame properly adjusted with respect to the camera. The light in the casing 26 is then switched on for a short period of time, whereupon the image carried by the negative or positive is projected onto the sensitized sheet.

It is believed the details of construction and manner of operation and use of the device will be readily understood from the foregoing without further detailed explanation.

Having thus described the invention, what I claim is—

1. In a photographic reproducing apparatus, a camera support, a lamp rearwardly of the camera, a chase receiving chamber between the camera and the lamp, a chase holder having an opening therein, means for adjustably mounting the holder in the chamber, a negative or positive chase adapted for mounting a negative or positive plate therein, and means carried by the chase for centering the same with respect to the opening, said means comprising threaded spreaders projecting through the walls of the chase with their outer ends abutting the walls of the chase holder and their inner ends overlying the edges of the plate carried by the chase for retaining the plate therein.

2. In a photographic reproducing apparatus, a negative or positive chase holder having an opening therein, a negative or positive chase adapted for mounting a negative or positive plate therein and means carried by the chase for centering the chase with respect to the opening, said means comprising threaded spreaders projecting through the walls of the chase with their outer ends abutting the walls of the chase holder and their inner ends overlying the edges of the plate carried by the chase for retaining the plate therein.

JAMES H. GENTRY.